United States Patent
Xiao et al.

(10) Patent No.: US 12,067,549 B2
(45) Date of Patent: Aug. 20, 2024

(54) SYSTEMS AND METHODS OF IMAGE PROCESSING AND SHRINKAGE EVALUATION

(71) Applicant: Walmart Apollo, LLC, Bentonville, AR (US)

(72) Inventors: Zhichun Xiao, Plano, TX (US); Chunmei Wang, Dallas, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 251 days.

(21) Appl. No.: 17/588,625

(22) Filed: Jan. 31, 2022

(65) Prior Publication Data

US 2023/0274248 A1   Aug. 31, 2023

(51) Int. Cl.

| | |
|---|---|
| *G06V 10/56* | (2022.01) |
| *G06Q 10/087* | (2023.01) |
| *G06Q 20/20* | (2012.01) |
| *G06V 10/26* | (2022.01) |
| *G06V 10/44* | (2022.01) |
| *G06V 10/50* | (2022.01) |
| *G06V 10/762* | (2022.01) |
| *G06V 20/52* | (2022.01) |

(52) U.S. Cl.
CPC ......... *G06Q 20/203* (2013.01); *G06Q 10/087* (2013.01); *G06V 10/267* (2022.01);
(Continued)

(58) Field of Classification Search
CPC .. G06Q 20/203; G06Q 10/087; G06Q 10/083; G06V 10/267; G06V 10/44;
(Continued)

(56) References Cited

U.S. PATENT DOCUMENTS 10,679,177 B1 *  6/2020  Liberato, Jr. ........ G06Q 10/087
11,775,930 B1 * 10/2023  Curlander ............ G06F 18/00
                                                                  705/28
(Continued)

FOREIGN PATENT DOCUMENTS

WO     2018149253        8/2018
WO     WO-2023028388 A1 *  3/2023  ....... G06Q 10/06393

OTHER PUBLICATIONS

Open Source Computer Vision; :Color conversion; Web page <https://docs.opencv.org/4.5.2/de/d25/imgproc_color_conversions.html#color_convert_rgb_hls>; available at least as early as Jul. 29, 2021; 5 pages.

(Continued)

*Primary Examiner* — Garcia Ade
(74) *Attorney, Agent, or Firm* — Foley IP Law, PLLC

(57) ABSTRACT

Some embodiments provide image evaluation systems and methods, comprising: a plurality of camera systems distributed about a retail facility and each of the plurality of camera systems; and an image processing system configured to receive multiple images over time, process each image comprising: determine, from pixel data, a gradient amplitude and directional component; determine a histogram curve from the gradient amplitudes as a function of the directional component of the pixel data, and identify a key direction relative to a maximum accumulation of the gradient amplitudes; for the gradient amplitudes, of the pixel data, having a corresponding directional component that is within a direction threshold of the key direction, identify a number of local maxima corresponding to the key direction; and determine a quantity of items of the product corresponding to a quantity of the number of local maxima.

18 Claims, 12 Drawing Sheets

(52) U.S. Cl.
CPC ............ *G06V 10/44* (2022.01); *G06V 10/507* (2022.01); *G06V 10/56* (2022.01); *G06V 10/762* (2022.01); *G06V 20/52* (2022.01)

(58) Field of Classification Search
CPC .... G06V 10/507; G06V 10/56; G06V 10/762; G06V 20/52; G06V 10/26
USPC .......................................................... 705/22
See application file for complete search history.

(56) References Cited

U.S. PATENT DOCUMENTS

| | | | |
|---|---|---|---|
| 2015/0262116 A1* | 9/2015 | Katircioglu | G06Q 10/087 705/28 |
| 2019/0164098 A1 | 5/2019 | Setchell | |
| 2020/0051272 A1 | 2/2020 | Mukherjee | |

OTHER PUBLICATIONS

Open Source Computer Vision; "Morphological Transformations"; web page <https://docs.opencv.org/4.5.2/d9/d61/tutorial_py_morphological_ops.html>; 4 pages, Jul. 16, 2021, retrieved from Internet Archive Wayback Machine <https://web.archive.org/web/20210716231623/https://docs.opencv.org/4.5.2/d9/d61/tutorial_py_morphological_ops.html> on May 2, 2022.

Suzuki, Satoshi, et al.; "Topological structural analysis of digitized binary images by border following"; Computer Vision, Graphics, and Image Processing; Apr. 1985; vol. 30; Iss. 1; pp. 32-46.

* cited by examiner

SYSTEMS AND METHODS OF IMAGE PROCESSING AND SHRINKAGE EVALUATION

TECHNICAL FIELD

This invention relates generally to image processing.

BACKGROUND

Many systems apply image processing. There are numerous uses for image processing systems and methods. Many of such systems are typically ineffective for use in a retail environments.

BRIEF DESCRIPTION OF THE DRAWINGS

Disclosed herein are embodiments of systems, apparatuses and methods pertaining to enhanced image processing used to identify items. This description includes drawings, wherein.

Figure 1:
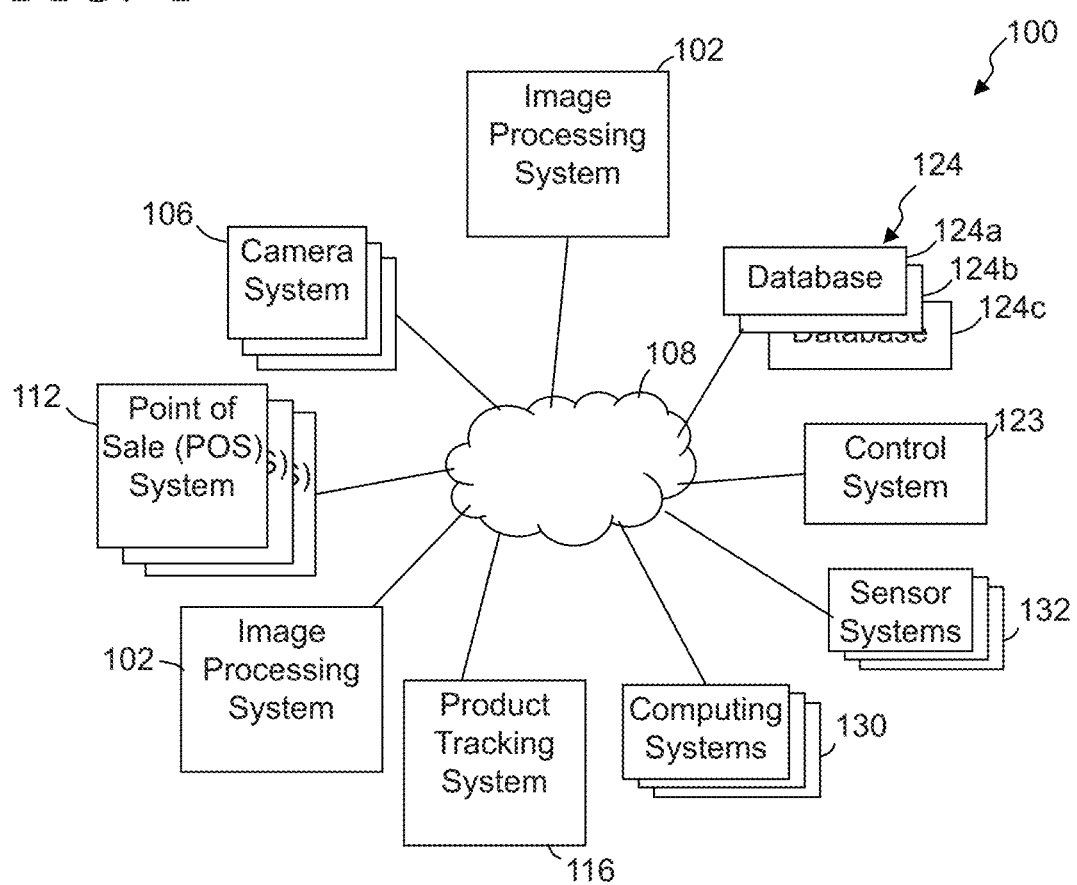
FIG. 1 illustrates a simplified block diagram of an exemplary image evaluation system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments provide enhanced image processing systems. Such enhanced image processing enables different applications, including for example, the use in tracking inventory in a retail environment. The retail industry expends large amounts of capital and utilizes extensive retail systems and technology to track inventory and manage inventory. Even with such systems, loss of sales due to theft, incorrect labeling, incorrect track and/or other such issued result in significant economic losses. Some embodiments provide improved technical systems taking advantage of an array of imaging systems distributed throughout a retail facility to capture images of products over time. Further, some embodiments incorporate an enhanced image processing systems that converts image data into accurate product counts. The image processing systems, in some embodiments, receive image data from the imaging systems and process those images to reduce computational processing and simplify the image processing by in part reducing the image into sub-sections based on image processing techniques and known characteristics of items being captured in the images. Further, some embodiments provide enhanced image processing by applying a gradient evaluation of pixel data to simplify the identification and distinguishing between items, which in some implementations enables accurate, real-time counts of at least some products within the retail facility. Based on the item counts and the tracking of inventory, the system is capable of more accurately identifying inconsistences in inventory, reduce potential losses, identify potential theft situations and other such benefits.

Generally speaking, pursuant to various embodiments, systems, apparatuses and methods are provided herein useful to improve image processing. Further, some embodiments provide systems, apparatus and methods that utilize the enhanced image evaluation and processing in tracking products in a retail environment. The retail environment is configured with a plurality of camera systems distributed about a retail facility and each of the plurality of camera systems is configured to capture images of items of one or more products of a plurality of products within the retail facility that are accessible and retrievable by customers for purchase. Some embodiments maintain a product mapping database comprising information about at least placement within the retail facility of items of multiple different products that are to be monitored. Further, some embodiments include a camera mapping database that maintains information about location information of the plurality of camera systems. One or more image processing systems are configured to receive multiple images over time from the plurality of camera systems each having a location corresponding to a location of a respective product to be monitored of the multiple products to be monitored. In some implementations the one or more image processing system are communicatively coupled with each of the plurality of camera systems.

The one or more image processing systems are further configured to process each of the multiple images, comprising for each image of the multiple images: determine, from pixel data for each pixel of at least a first sub-section of the first image, a gradient amplitude and directional component; determine a first histogram curve from the gradient amplitudes as a function of the directional component of the pixel data, and identify a first key direction relative to a first maximum accumulation of the gradient amplitudes; for the gradient amplitudes, of the pixel data, having a corresponding directional component that is within a first direction threshold of the first key direction, identify a number of local maxima corresponding to the first key direction; and determine a quantity of items of the first product corresponding to a quantity of the number of local maxima that are each within a threshold distance from another one of the number of local maxima.

Other embodiments provide methods of processing images, comprising: receiving, at an image processing system from a plurality of camera systems distributed about a retail facility and configured to capture images of items of one or more products of a plurality of products within the retail facility that are accessible and retrievable by customers for purchase, multiple images over time from a first camera system of the plurality of camera systems having a location corresponding to a location of a first product to be monitored of the multiple products to be monitored; for each image: determining, from pixel data for each pixel of at least a first sub-section of the first image, a gradient amplitude and directional component; determining a first histogram curve from the gradient amplitudes as a function of the directional component of the pixel data, and identify a first key direction relative to a first maximum accumulation of the gradient amplitudes; identifying, for the gradient amplitudes, of the pixel data, having a corresponding directional component that is within a first direction threshold of the first key direction, identify a number of local maxima corresponding to the first key direction; and determining a quantity of items of the first product corresponding to a quantity of the number of local maxima that are each within a threshold distance from another one of the number of local maxima.

FIG. 1 illustrates a simplified block diagram of an exemplary image evaluation system 100, in accordance with some embodiments. The image evaluation system 100, in some embodiments, is utilized for example in a retail environment (e.g., retail store, distribution center, warehouse, etc.), tracking parts used in assembling and/or manufacturing, tracking manufactured items in a manufacturing facility, tracking items being shipped, and other environments where it can be beneficial to determine quantities of items and/or track items. The image evaluation system 100 includes one or more image processing systems 102 that are configured to receive images (e.g., still images, one or more frames of video content, etc.) from a plurality of camera systems 106 and/or other image capture systems. Typically, the one or more image processor systems 102 are communicatively coupled with each of the plurality of camera systems over one or more distributed communication and/or computer networks 108. The network 108 can include and/or utilize a local area network (LAN), a wide area network (WAN), the Internet, wireless networks (e.g., BLUETOOTH, WI-FI, cellular, etc.), satellite, other such networks, and typically a combination of two or more of such networks.

In some embodiments, the plurality of camera systems 106 are distributed about at least one retail facility (e.g., a retail store, fulfillment center, distribution facility, trucks, etc.). Each of the plurality of camera systems 106 is configured to capture images of items of one or more products of a plurality of different products within the retail facility. For example, some embodiments position at least some of the camera systems 106 in the retail facility to capture images of items of at least one product of the multiple different products that are positioned within the retail facility to be accessible and retrievable by customers for purchase, and that are within the field of view of the respective camera system.

In some embodiments, the image evaluation system 100 further includes one or more databases 124 and/or other such computer memory storing data, information, images and/or other relevant content. The databases 124 can include, for example, but are not limited to one or more product mapping databases 124a that maintain information about at least placement within the retail facility of items of multiple different products to be monitored; one or more camera mapping databases 124b maintaining information about location information of the plurality of camera systems, camera system settings, parameters, capabilities and/or functionalities; one or more inventory databases 124c maintaining for example, inventory quantities as a function of the sales data and product shipping information, loss inventory information, pending orders, pending deliveries information, rates of sales information, product demand information, other such information or a combination of two or more of such information; one or more product information databases maintaining information about products (e.g., size, weight, dimensions, etc.), packaging (e.g., color patterns, colors, shapes, text information, patterns, etc.), other such information, or a combination of such information); other such databases and/or storage of data and information; and typically a combination of two or more of such information storage.

Further, in some embodiments, the image evaluation system 100 further includes one or more and typically a plurality of point of sale (POS) systems 112 positioned within the retail facility and/or electronically maintained remote from the facility (e.g., enabling e-commerce purchasing). Each of the POS systems 112 is configured to complete sales transactions for customers of items of the plurality of different products offered for sale through the retail entity and/or facility. These products include the multiple different products to be monitored. The POS systems 112 are further configured to communicate sales data of the completed sales transactions to one or more systems of the image evaluation system 100, other systems of the retail facility, other systems remote from the retail facility, and/or other such systems. The POS data can be used to update inventory information, track product demand, determine loss information, and the like. For example, some embodiments include one or more product tracking system 116 communicatively coupled over the communication network 108 with at least one image processing system 102, one or more of the plurality of POS systems 112, one or more of the databases 124, and/or other system components.

Some embodiments include one or more control systems 128 communicatively coupled with the image processing systems 102 to receive information from the image processing systems and provide operational parameters, instructions and/or other such information. In some implementations, the control system 128 operates remote from the retail facility and provides a central control over multiple different retail facilities and respective image evaluation systems 100 associated with different retail facilities. The control system 128, for example, is configured to manage inventory information across multiple facilities and uses loss information in implementing one or more aspects of inventory management. Similarly, in some embodiments, the control system 128 provides firmware updates, manages resources over the distributed communication network 108 and/or other such control. Further, in some embodiments the system 100 includes and/or communicates with one or more computing systems 130 such as one or more portable computing systems (e.g., smartphone, laptop, tablet, cellular phone, etc.), computers, servers and/or other such computing system that enables the further processing, to which notifications are communicated, from which inputs and/or commands are received, and/or other such functionality. The computing systems communicatively couple with the network 108 and can operate local at the retail facility and/or remote from the retail facility. Some embodiments include one or more sensors 132, such as but not limited to radio frequency identification (RFID) sensors to detect RFID tags (e.g., on items, packaging, workers, computing systems, customers' computing systems, customers' membership card associated with the retail facility, item transport systems (e.g., shopping carts, baskets, flatbottom, pallet carts, forklifts, robotic transport and/or retrieval systems, etc.), etc.), barcode readers, pressure and/or weight sensors (e.g., on shelf systems), movement sensors, other such sensors, or a combination of two or more of such sensors. In some instances, one or more sensor systems may be associated with a respective one of the point of sale systems 112. One or more of the sensor systems 132 are communicatively coupled with one or more of the computer and/or communication networks 108 to supply relevant sensor data and/or information (e.g., product identification information, worker identification information, transport system identification information, movement information, images and/or video content, etc.).

As described above, the image evaluation system 100 is configured to evaluate image data captured by the one or more camera systems 106. In some implementations, for example, the image evaluation system 100 uses image data from the camera systems to identify quantities of and/or track items of products at the retail facility, a manufacturing facility, shipping facility, transportation industries (e.g., tracking luggage), and other such industries. Further, the image processing systems 102, in part are configured to receive captured images (e.g., still images, video content, etc.) and evaluate the images to distinguish between packaging and products, and determine quantities of items of products and/or other objects being tracked.

Figure 2:
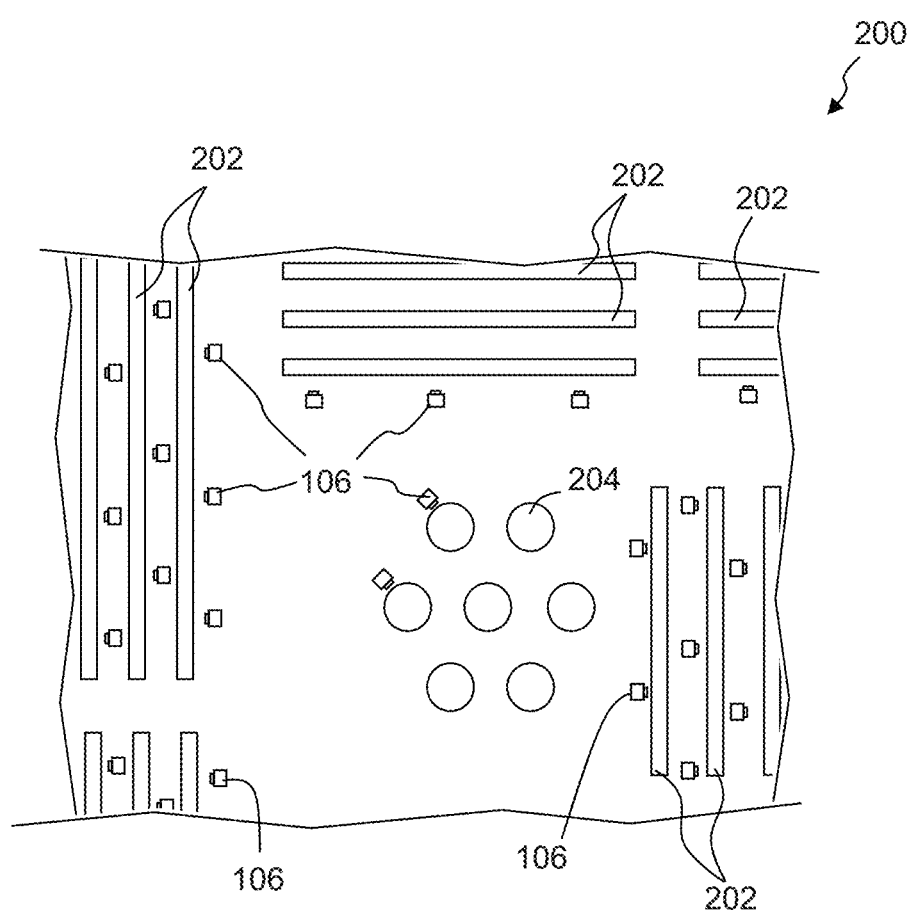
FIG. 2 illustrates a simplified block diagram, overhead view of a portion of an exemplary retail facility, in accordance with some embodiments.

In retail facilities, for example, it is common for a collection of items of a particular product to be placed out on the retail floor over which customers are moving to shop for and retrieve items they intend to purchase. FIG. 2 illustrates a simplified block diagram, overhead view of a portion of an exemplary retail facility 200 that includes multiple shelf systems 202, racks 204 and the like distributed over on the sales floor and configured to receive and support products, in accordance with some embodiments. Referring to FIGS. 1-2, the shelf systems 202, racks 204 and other such structures define isles and other areas through which customers and work associates can move. In some embodiments, multiple camera systems 106 are positioned relative to one or more shelf systems 202 and/or racks 204 to capture images of one or more products supported by the respective shelf system or rack. The images are accessed by one or more of the image processing systems 102.

Figure 3:
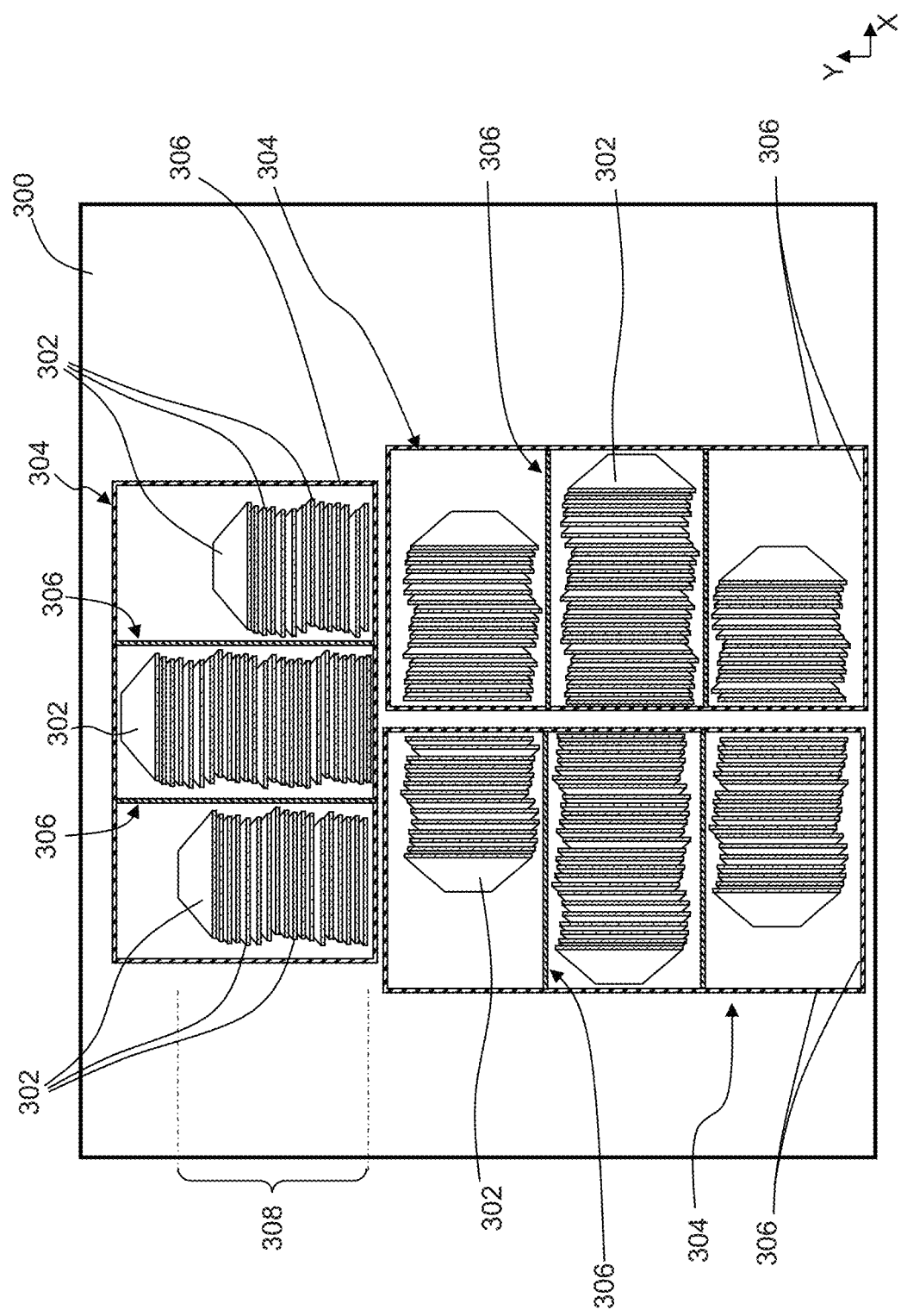
FIG. 3 illustrates a simplified block diagram at least a portion of an exemplary image of items of a product, in accordance with some embodiments.

FIG. 3 illustrates a simplified block diagram at least a portion of an exemplary image 300 of items 302 of a product, in accordance with some embodiments. As will be appreciated, in some instances, when items of a product are placed on the retail floor, the items are often organized and maintained with boxes 304. Further, multiple boxes of items 302 are often positioned together on a shelf system, rack or other such structure. Accordingly, the identification of individual items 302 is typically difficult, particularly in many instances where the camera systems are positioned several feet away, such as more than 5 feet and often more than 10 feet when the camera systems are mounted from a ceiling of the retail facility. Similarly, the images captured may include more area than shown FIG. 3. Accordingly, some embodiments further crop initial images into working images relative to one or more particular products of interest. This sub-division of an initial image may be preformed based on one or more predefined markers within a retail facility (e.g., part of a shelf system, one or more predefined marks affixed to a shelf system, floor, etc., a known division based on a known location of the respective camera system and/or a known capture area of the retail store captured in an image, and/or other such methods of sub-dividing an initial image into an image 300 corresponding to a product of interest.

Additionally, the boxes include external and/or internal boundaries 306, and in some instances one or more boxes include inner dividers 306 that further organize and/or maintain positions of items 302 of a product. Such dividers 306, in some implementations, establish sub-sections, cells or other such sub-divisions each configured to receive and position one or more items 302. For example, the dividers 306 position items 302 into columns 308 and/or rows of sub-sets of the items positioned within the box 304. Similarly, such dividers can further provide some protection to items during transport, provide added stability, structure and rigidity, and other such functions and benefits to the respective box 304.

In some embodiments, one or more of the image processing systems 102 evaluate a respective image received from a known camera system 106 in determining whether multiple boxes 304 are captured in an image 300 and/or identify the different boxes 304 within the image. Some embodiments take advantage of known shape information and/or color pattern of the packaging. The image processing system 102, in some implementations, accesses a camera mapping database 124b to determine a location within the retail facility where the camera system 106 is located and determine an area of the retail facility being captured within a respective image from the camera system. The images received can include identifying information of the camera system capturing the image. Additionally or alternative, the image processing system 102 accesses a mapping database 124$a$, based on the camera system location and/or location in the retail facility captured in the image, to identify a product at the determined location within the image. Further, a product database is accessed in some implementations to obtain relevant information about the identified product (e.g., size, shape, known colors, color pattern(s), text information, text location on the packaging, and/or other such information).

In some embodiments, for example, many products to be tracked are packaged with multiple items placed into a single box 304, for example because of size. Often, the external packing of the box and/or packaging of items has a known color that is used to differentiate the box from other similar boxes of the same product and/or other products. Additionally or alternatively, such color information is used in some implementations to distinguish the items and/or box of items from a background. Some embodiments, for example, transform an Red, Green, Blue (RGB) image to an HSV (hue, saturation, value) color space through one or more known techniques. Based on the hue, saturation and/or value, a pixel is determined to be foreground or background. In some implementations, a pixel is defined as foreground when its hue satisfies a hue threshold and/or saturation satisfy a saturation threshold. Further, the thresholds typically vary depending on a color being considered, a color pattern of the box, and/or other such aspects. Further, some embodiments utilize a foreground prediction machine learning model. Various machine learning models are known in the art. For the sake of an illustrative example, it will be presumed here that this foreground prediction machine learning model comprises a neural network machine learning model, and in particular, a convolutional neural network. Further, in some embodiments the foreground prediction machine learning model has been trained using a training corpus that includes a plurality of known box color patterns, shapes, sizes and/or other such factors, and/or known product packaging color patterns, shapes, sizes and/or other such factors. These known parameters, for example, may comprise, in whole or in part, color patterns and factors of known products that are within the retail facility or may be placed into the retail facility. In this example, the training corpus includes some, but typically not all, possible patient volumes of interest, as product boxes, color patterns and/or packaging change over time.

Using this information, the image processing system 102 selects a shape based on known shape and/or dimensions (e.g., a rectangle) that covers predicted foreground pixels. Based on the identification of boxes, the initial image, when needed, is cropped (e.g., as illustrated in FIG. 3, image 300) according to the determined box or boxes (e.g., rectangle image), and mask the foreground pixels as a gray foreground image.

Figure 4:
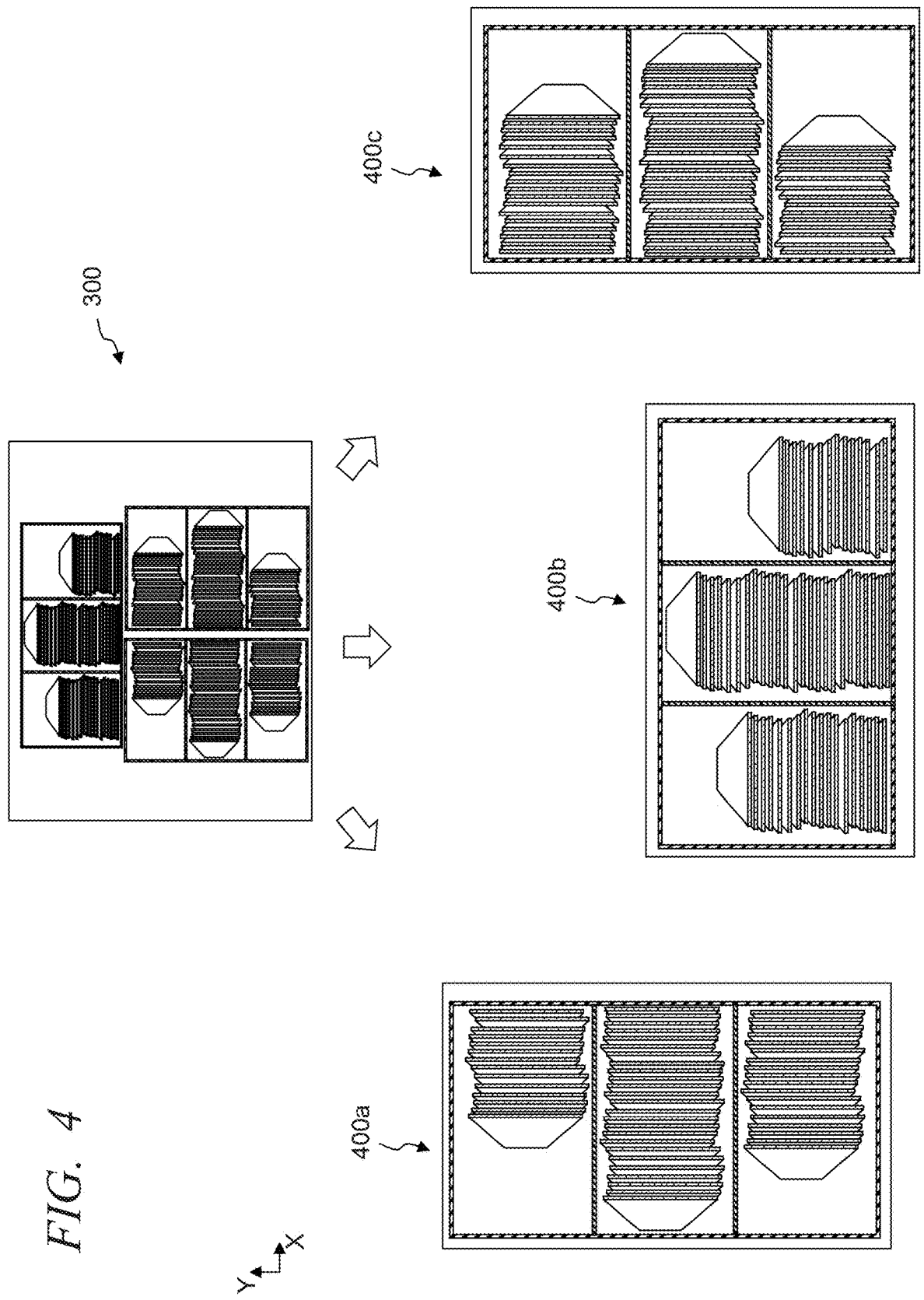
FIG. 4 illustrates a simplified example of an exemplary identification and separation of an image into multiple box sub-section images, in accordance with some embodiments.

The image processing system 102, in some embodiments further evaluates color data of the pixel data relative to the respective known color pattern of packaging of the first product based on known dimensions of the packaging of the product and segments, from within the image 300 based on the evaluation of the color data, the image 300 into multiple different box sub-sections of the image 300. FIG. 4 illustrates a simplified example of an exemplary identification and separation of an image 300 into multiple box sub-section images 400$a$-400$c$ (e.g., three box sub-section images in this illustrated example), in accordance with some embodiments. Again, based on inventory data it is known whether there is expected to be multiple boxes of a product, and accordingly, known whether an image 300 is expected to include multiple boxes. As such, the separation into box sub-section images 400 is implemented when it is expected that multiple boxes are present. Some embodiments, for example, perform known mathematical mythology operator to identify the boundaries of the boxes. For example, some embodiments apply one or more morphological transformations (e.g., erosion and/or dilation) separately to a gray foreground image. Contours from the binary image are identified using one or more known techniques (e.g., topological structural analysis) to distinguish between boxes. Based on the identification of multiple boxes, some embodiments split the image 300 into the box sub-section images 400$a$-400$c$ corresponding to areas of interest. Alternatively and/or additionally, some embodiments apply a fast clustering method (e.g., k-nearest neighbors algorithm (KNN)) to identify box boundaries and determine how to separate into the box sub-section images.

In some embodiments, the box sub-section images 400 are further evaluated to determine whether multiple columns and/or rows are included and/or to separate a box sub-section image into further sub-images based on columns and/or rows. Again, the packaging information is typically known, and accordingly, the separation into respective rows and/or columns can be implemented in those instances where a box is known to include multiple columns and/or rows, while not performing the separation into rows and/or columns when the packaging information designates there are not separations of items 302 and/or physical dividers 306. In some instances, the box may include dividers, walls, or other such structures to establish sub-sections (e.g., columns and/or rows), while in other instances items 302 are organized within the box 304 in columns and/or rows without structures, and divisions between effective columns and/or rows are merely established based on positioning of the items 302. Further, the separation into sub-images may be limited to instances where it is further known based on the product information that multiple items are expected in a single column and/or row.

Figure 5:
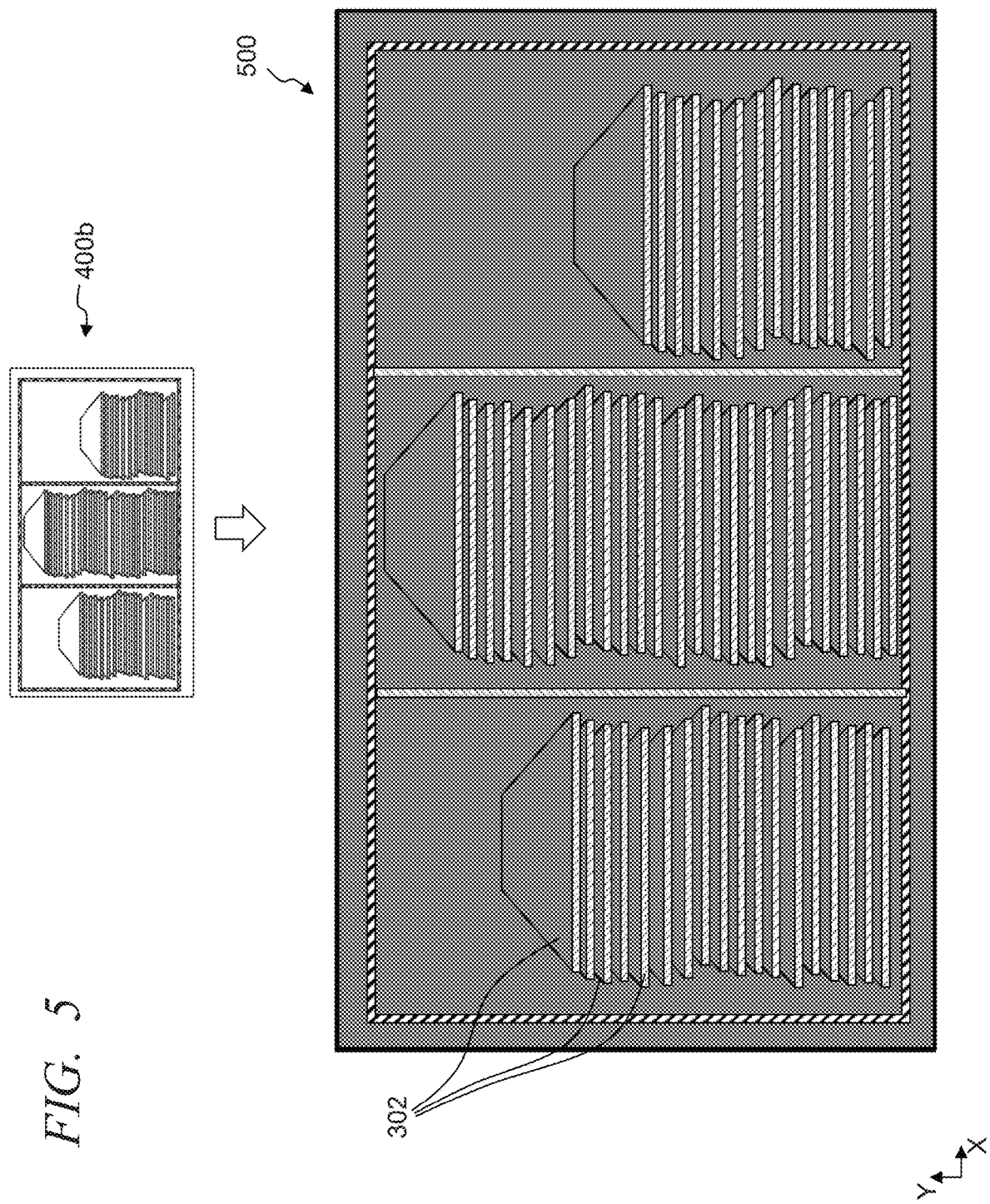
FIG. 5 illustrates a simplified block diagram of an exemplary gradient amplitude image, in accordance with some embodiments.

The separation into sub-images based on the columns and/or rows can be implemented through one or more techniques. Some embodiments, for example, further utilize the HSV (hue, saturation, value) color space similar to that described above. Additionally or alternatively, some embodiments process one or more, and typically all of the box sub-section images 400$a$-400$c$ to determine gradient amplitude images. FIG. 5 illustrates a simplified block diagram of an exemplary gradient amplitude image 500 of one of the box sub-section images (e.g., box sub-section image 400$b$), in accordance with some embodiments. From pixel data for each pixel of each box sub-section image 400 of the respective image 300, using known techniques gradient amplitude (grad(x,y)) and corresponding directional components (angle(x,y)) are determined. Some embodiments, for example, utilize the following:

$$dx = p(x+1,y) - p(x,y) \qquad (\text{eq. 1})$$

$$dy = p(x,y+1) - p(x,y) \qquad (\text{eq. 2})$$

$$\text{grad}(x,y) = \sqrt{(dx^2)+(dy^2)} \qquad (\text{eq. 3})$$

$$\text{angle}(x,y) = \arctan \qquad (\text{eq. 4})$$

where p(x,y) is a gray value of pixel (x,y) in the array of pixels of the box sub-section image 400, and angle(x,y) belongs to (−90°, +90°].

Some embodiments further determine an image and/or box sub-section histogram curve from the gradient amplitudes as a function of the directional component of the pixel data. In some implementations, the image processing system applies one or more known statistical weighting algorithms to determine weighted gradients' directions. One or more local maxima of histogram are determined. Using the histogram curve or one or more portions of the histogram curve, some embodiments identify key directions relative to one or more maximum accumulations of the gradient amplitudes. In some embodiments two or more of the maximum directions are determined. For example, a first local maxima direction and second local maxima direction are identified as first and second key directions, from the histogram curve, relative to respective maxima accumulation of the gradient amplitudes.

Figure 6:
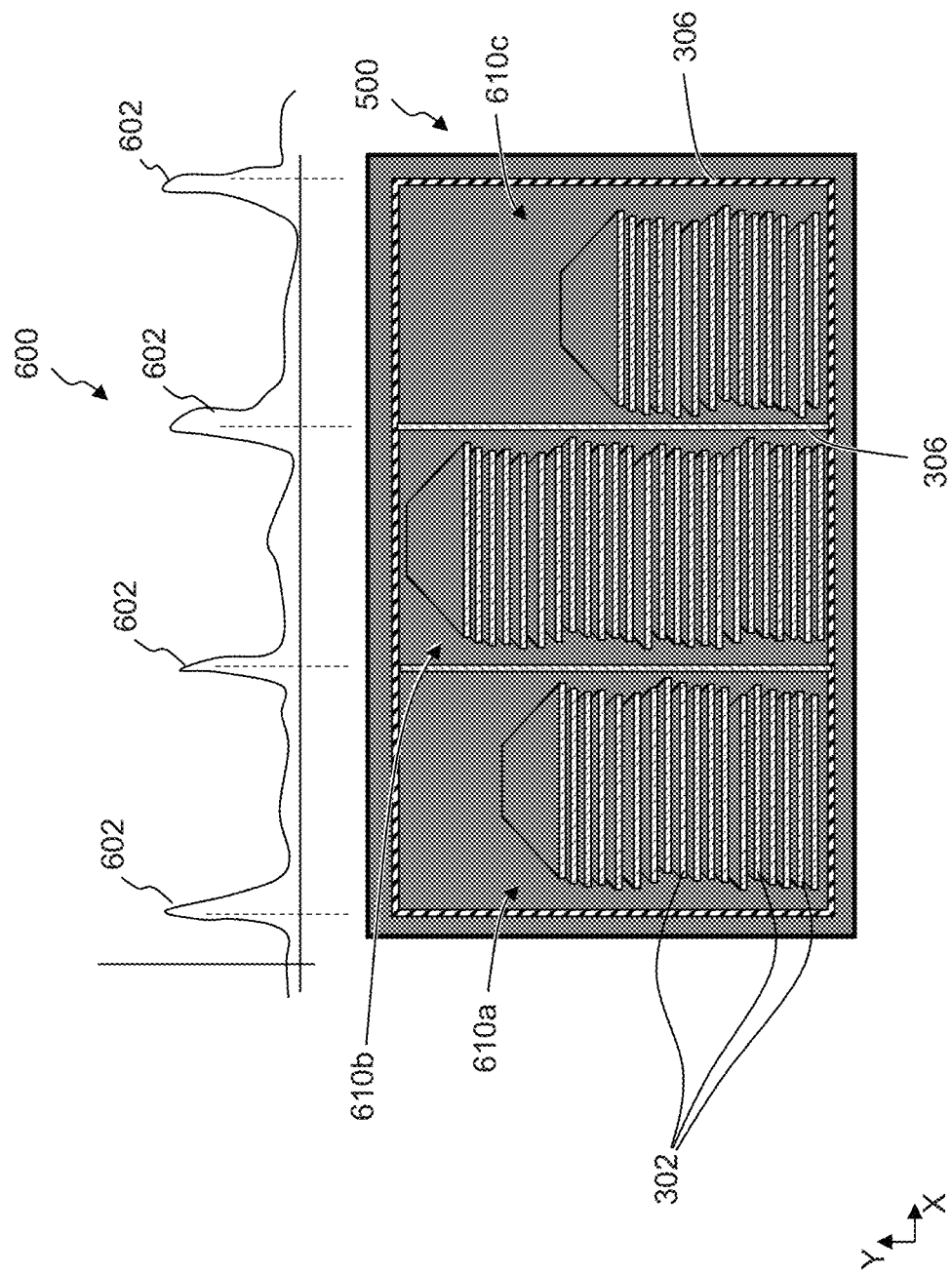
FIG. 6 illustrates a simplified graphical representation of an exemplary box sub-section curve of gradient relative to a second key direction of the directional component of the pixel data in relation to an exemplary gradient amplitude image of one of the box sub-section images, in accordance with some embodiments.

The gradients are evaluated relative to one of the key directions. For example, some embodiments use the gradients whose corresponding directions are within a direction threshold variation of one of the key directions, such as a second or secondary key direction determined relative to a second local maxima. Along the direction of secondary local maxima, gradients are accumulated to obtain a curve of gradients. FIG. 6 illustrates a simplified graphical representation of an exemplary box sub-section curve of gradient 600 relative to the second key direction (for example, a y-axis direction) of the directional component of the pixel data in relation to an exemplary gradient amplitude image 500 of one of the box sub-section images (e.g., 400*b*), in accordance with some embodiments. From the curve of gradients 600, one or more local maxima 602 are determined. Based on the identified multiple local maxima, the image processing system identifies, within the gradient amplitude image 500, and accordingly the image 300, packaging boundaries 306, which in some instances define multiple sub-sections 610*a*-610*c* (e.g., columns and/or rows) of a packaging in which the items 302 of the product are positioned. Based on the known packaging configuration, and the determined boundaries 306 within the image determined based on the maxima, the image processing system in some embodiments divides the box sub-section images 400 and/or the image 300 into column and/or row sub-images each corresponding to one of the sub-sections 610 of the packaging identified based on the identified packaging boundaries 306.

Figure 7:
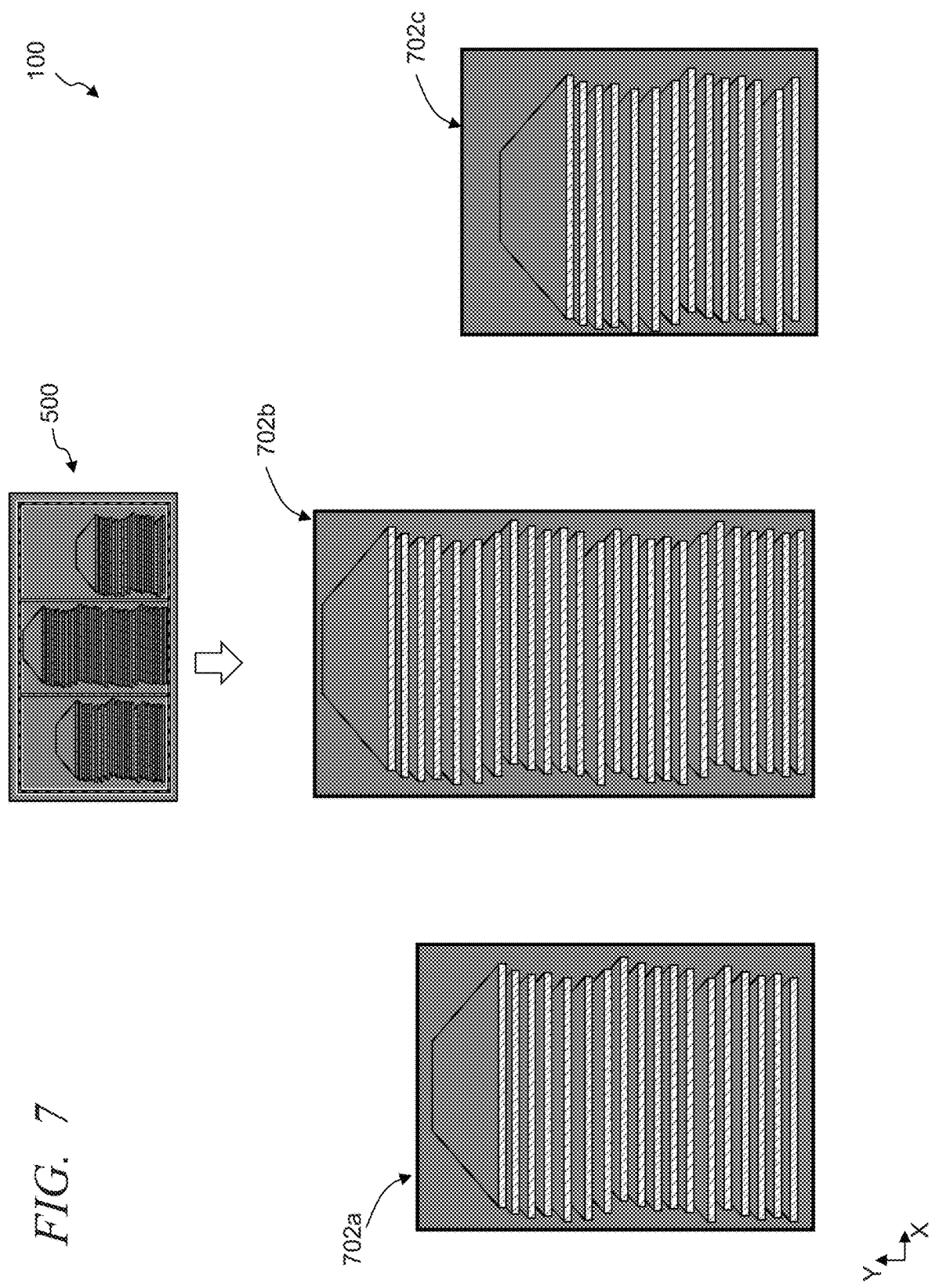
FIG. 7 illustrates a simplified block diagram of an exemplary gradient amplitude image of a box sub-section image divided into multiple sub-images each corresponding to one of the sub-sections identified, in accordance with some embodiments.

FIG. 7 illustrates a simplified block diagram of an exemplary gradient amplitude image 500 of one of the box sub-section images (e.g., 400*b*) divided into multiple sub-images 702*a*-702*c* (e.g., column sub-images, in the illustrated example, and/or row sub-images) each corresponding to one of the sub-sections 610 identified, in accordance with some embodiments. In some embodiments, the image processing system 102 performs the same or a similar process in identifying packaging of respective items 302 within the multiple sub-images 702. The image processing system, in some implementations, in identifying the number of local maxima corresponding to the key directions is configured to identify, within each sub-image 702, a subset of the number of local maxima corresponding to at least one key direction in the respective sub-image (e.g., a primary or first key direction). The first key direction is a different direction than the second key direction. In many instances, this first key direction (e.g., along an x-axis) is substantially orthogonal to the second key direction.

Figure 8:
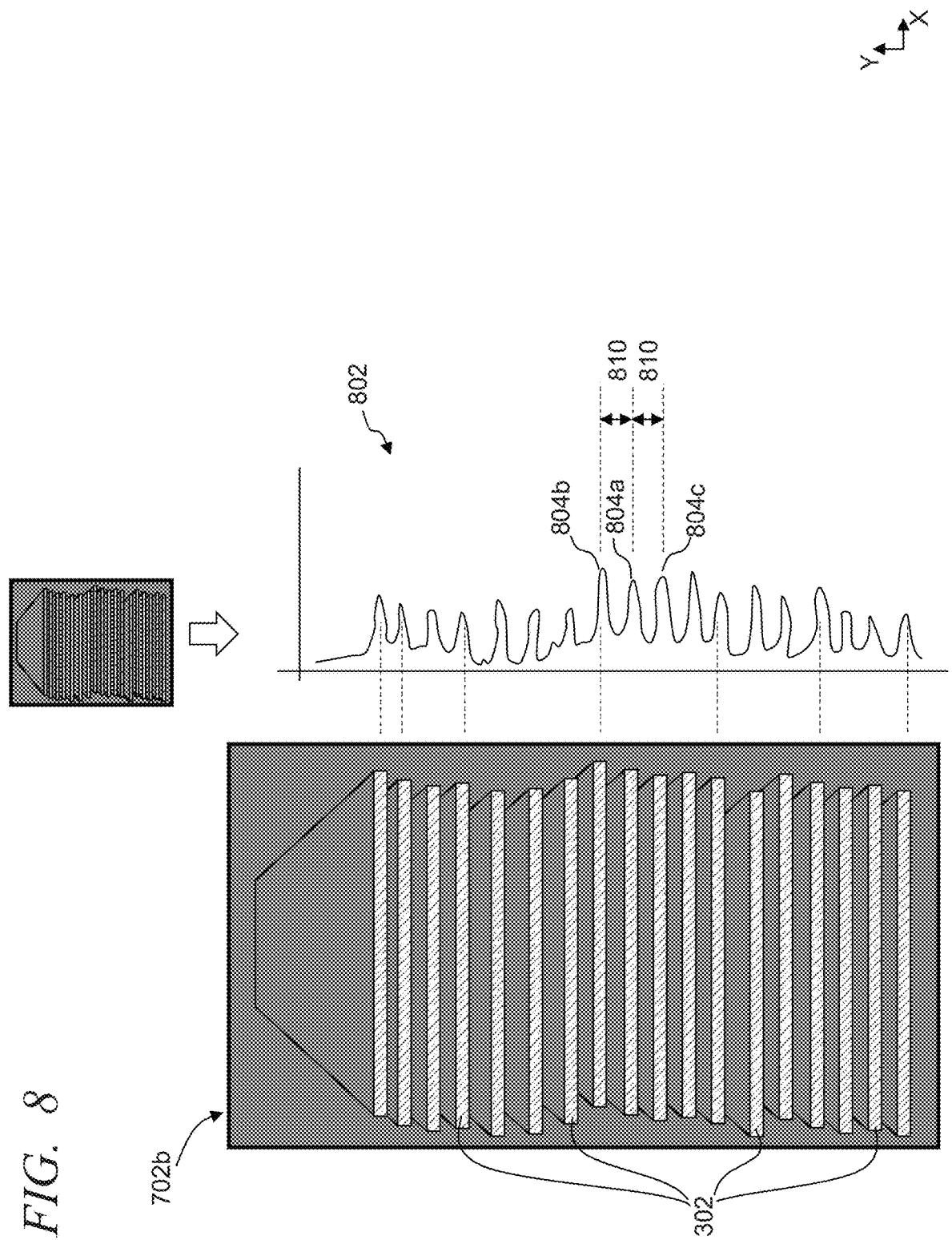
FIG. 8 illustrates a simplified graphical representation of an exemplary sub-image curve of gradient relative to a first key direction of a directional component of pixel data in relation to an exemplary column sub-image, in accordance with some embodiments.

In some embodiments, the image processing system 102 uses the gradients having a corresponding direction are with a threshold variation of the first key direction determined relative to the first local maxima. These gradients, along the direction of first local maxima, are accumulated to obtain a first or primary curve of gradients of pixels based on the gradients having the corresponding directional component that is within the directional threshold of the first key direction. From the first curve of gradients, the image processing system 102 calculates the local maxima. FIG. 8 illustrates a simplified graphical representation of an exemplary sub-image curve of gradient 802 relative to the first key direction (for example, an x-axis direction) of the directional component of the pixel data in relation to an exemplary column sub-image (e.g., sub-image 702*b*), in accordance with some embodiments. Based on the identified local maxima along the first direction, the image processing system 102 in some embodiments is configured to determine a sub-quantity or number of the items 302 of the product are captured within the respective sub-image 702.

In some implementations, the image processing system further evaluates the spacing and/or relative distance of the local maxima corresponding to the first direction in confirming a respective local maxima corresponds to an item 302. As one non-limiting example, the image processing system correlates a local maxima (e.g., local maxima 804*a*) to an item 302 when the distances 810 to one or more neighboring local maxima (e.g., 804*b* and 804*c*) are similar and/or are within a threshold of an expected distance, which is typically based on known dimensions of the package of the item 302. Accordingly, the sub-quantity of items it typically approximately equal to and/or corresponds to a sub-quantity of the subset of the number of the local maxima 804 of the respective sub-image 702. As such, in some embodiments, based on the gradient amplitudes, of the pixel data, having a corresponding directional component that is within a direction threshold of the first key direction, the image processing system 102 identifies a number of local maxima corresponding to the first key direction within the respective sub-image 702. Based on those local maxima, the image processing system determines a sub-quantity of items 302 of the product within a respective sub-image 702 corresponding to a quantity of the number of local maxima 804 that are each within a threshold distance from another one of the number of local maxima 804. Again, this is a sub-quantity based on a single sub-image 702.

Typically, the image processing system 302 repeats the above counting process for each column and/or row sub-image 702 of each identified box identified in the image 300, based on the known package configuration. For example, the multiple sub-sections 610 of a packaging each corresponds to one of multiple columns and/or rows of the packaging and within each of the columns and/or rows is contained the respective sub-quantity of the items 302 of the product.

The image processing system determines a total number of the items 302 in the captured image 300 as a sum of the determined sub-quantities of the items 302 of the product from the multiple different sub-images 702 extracted from the image 300. In the non-limiting examples illustrated in FIGS. 3-8, the image 300 may include three different boxes 304 of items 302, with each box including three columns, and as such nine sub-images 702 are extracted from the image 300. The total number of items 302 is determined as a sum of the sub-quantiles of items detected in each of the extracted nine sub-images 702. As described above, the configuration of the box and/or packaging of the products are known. In some embodiments, this information is provided by a product manufacturer and/or supplier, provided by a third party service, determined by an associate based on visual inspection and measurement, and/or other such methods.

As introduced above, the image processing system, in some embodiments, does not divide the image into sub-images 702 and/or do not divide the image into box images 400. For example, when it is known that the packaging does not include columns and/or rows of items 302, the image processing system can skip the division of the image. Accordingly, in instances where it is known packaging does not include columns and/or rows, the image processing system 102, can initially determine whether there are multiple boxes of the product captured in the image 300. In some embodiments, the image processing system 102, in evaluating the color data of the pixel data, is configured to apply one or more known color clustering techniques to the pixel data of the image 300 based on the known color pattern of the packaging of the product. Based on the determined color clustering, the image processing system segments or divides the image 300 into the multiple box sub-section images 400 based on the color clustering.

In determining the quantity of the items 302 of the product captured in an image 300 or portion of an image identifies, the image processing system 102 determines the first key direction relative to the first maximum accumulation of the gradient amplitudes of the image 300 or for each box sub-section image 400. The number of local maxima is identified, for the image 300 or each box sub-section image 400 of the multiple box sub-section images, corresponding to the first key direction. The multiple boxset quantities of the items 302 of the product is determined for each corresponding to one of the box sub-section image 400 of the first image 300. In some embodiments, the respective boxset quantity of the items 302 of the product corresponds to respective quantities of the number of the local maxima that are each within the threshold distance from another one of the number of local maxima. The multiple boxset quantities are summed to obtain the quantity of items 302 of the product.

Further, in some embodiments, the image evaluation system 100 further includes and/or communicates with one or more product tracking systems 116 that is configured to use the determined quantities of the item 302 in tracking inventory, identifying discrepancies in inventory, detecting discrepancies between sales data and expected inventory, and/or other such tracking. The product tracking system 116, in some embodiments, includes and/or couples with an inventory database 124c that maintains information about current, future and/or historic inventory. In some embodiments, for example, the inventory database 124c maintains inventory information about current expected quantities of the products offered for sale by one or more retail entities, shipping information used to predict expected deliveries of inventory to the one or more retail facilities, and other such information. The product tracking system, in some implementations, receives sales information from the one or more point of sale systems 112 and uses the sales information to adjust inventory counts over time. Further, in some implementations, the product tracking system 116 maintains information about sales trends based in part on historic sales that can be used in predicting demands of products and expected sales rates in predicting available quantities and/or in ordering products for delivery.

The product tracking system 116, in some embodiments, further uses the determined quantities of items over time in relation to sales information in attempting to detect discrepancies in expected inventory quantities of one or more products. For example, the product tracking system 116 uses the determined quantities and sales data to identify when the sales data and the quantities on the sales floor of one or more products are inconsistent and indicating potential theft of items of the product, incorrect placement of items of the product, failure of workers to move items of the product to the sales floor, other such issues, or a combination of two or more of such issues. Similarly, the product tracking system 116 can confirm the consistency between quantities of sales information in determining that one or more issues are not present, work tasks are being performed, and/or other such identifications.

As described above, the image evaluation system 100 is not limited to retail entities and/or technology. Accordingly, in some embodiments, the product tracking system 116 is configured to maintain an inventory database 124c comprising at least inventory quantities of different products, parts, components, shipping packages, shipping containers, vehicles, and the like used by an entity (e.g., manufacturing, shipping, etc.). Similarly, the product tracking system 116 can couple with other systems that use parts, components, move packages, and the like in tracking use of and/or quantities of parts, components, packages, etc.

The product tracking system 116, in some embodiments, is communicatively coupled with the image processing system 102 and the plurality of POS systems 112. The product tracking system 116 is configured to maintain the inventory database 124c that comprising inventory quantities of different products as a function of the sales data and product shipping information. In some embodiments, the product tracking system evaluates the inventory quantities relative to the determined quantity of items 302 of the product received from the image processing system 102, and identifies when there is a threshold discrepancy as a function of the inventory quantities relative to the determined quantity of items 302 of the product. When there is a threshold discrepancy, the product tracking system 116 and/or inventory tracking system generates a notification of the discrepancy. In some embodiments, the product tracking system 116 controls a central system to generate an alert, modifies content displayed on a system as an alert, and/or other actions. Further, in some implementations, the product tracking system 116 controls a product movement system that uses historic images, video content, sensor data and/or other relevant information in attempts to identify an individual that is expected to have removed one or more items of the product in attempts to identify a potential theft event. In some embodiments, the product tracking system 116 further controls a user device of one or more workers to cause the user device to generate a visual and/or audible notification and/or to supply instructs to a worker regarding reacquiring potential theft items and/or detaining one or more individuals attempting to steal product.

Figure 9:
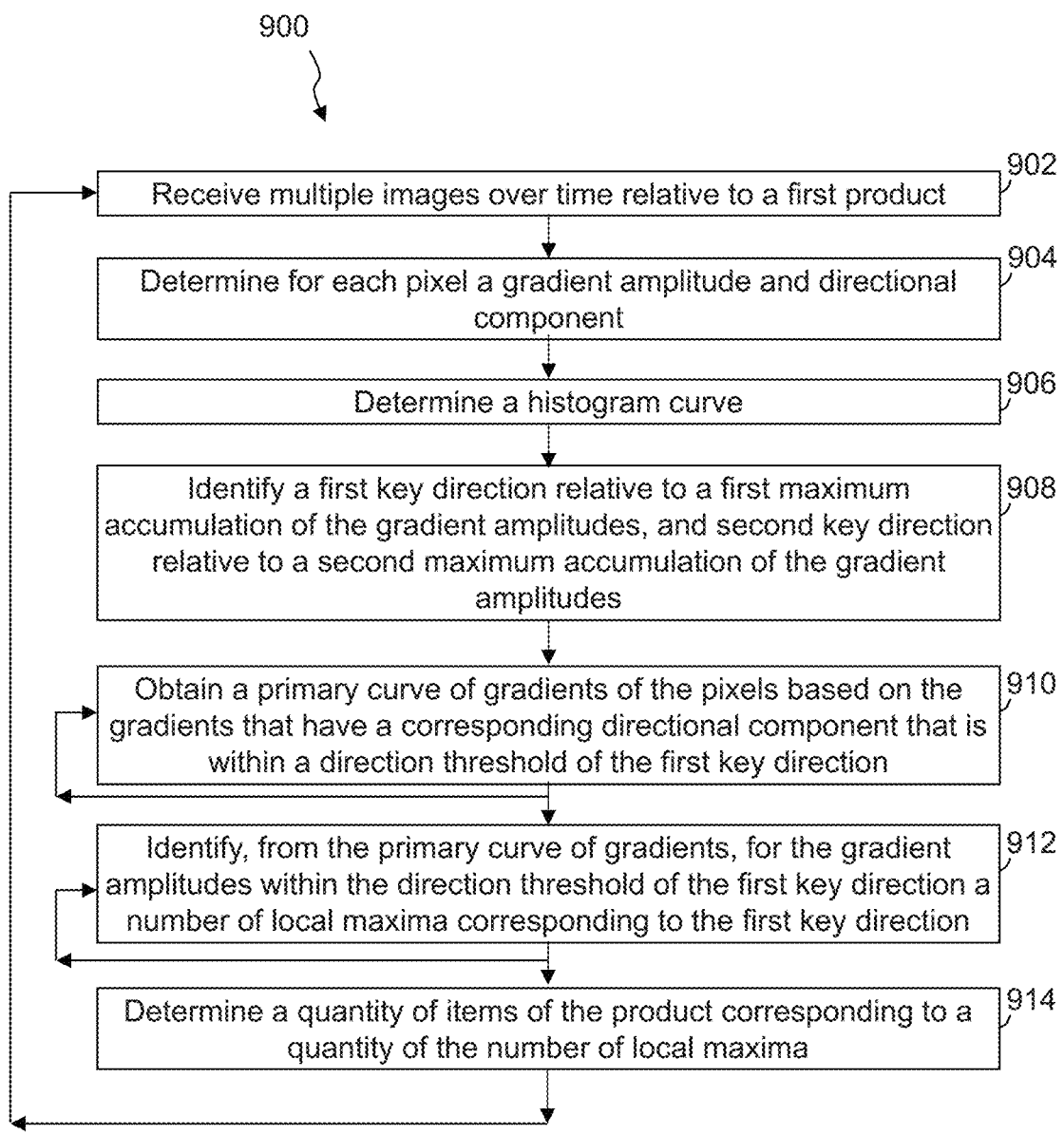
FIG. 9 illustrates a simplified block diagram of an exemplary process of processing images, in accordance with some embodiments.

FIG. 9 illustrates a simplified block diagram of an exemplary process 900 of processing images, in accordance with some embodiments. In step 902, the image processing system 102 receive multiple images over time from one or more camera systems 106 of a plurality of camera systems each having a location corresponding to a location of at least a respective one product to be monitored of multiple different products to be monitored at a retail facility, a manufacturing facility, a shipping facility, a pharmacy facility, a distribution facility, and/or other such facilities and/or entities. Typically, the plurality of camera systems 106 are distributed about the facility and configured to capture images of items of one or more of the products within the facility. For example, the facility may be a retail facility and the products are positioned in the retail facility with at least some of the products being accessible and retrievable by customers for purchase (e.g., on a sales floor of the retail facility through which customers move shopping for products to purchase).

In step 904, the image processing system 102, for each image 300 determines a gradient amplitude and directional component from pixel data for each pixel of at least a sub-section of a particular image. In some instances, for example, the image may be cropped about a known area where a particular product being monitored is positioned within the image. In step 906, at least one histogram curve is determined and/or generated from the gradient amplitudes as a function of the directional component of the pixel data. In step 908, the image processing system identifies, from the histogram curve, at least a first key direction relative to a first maximum accumulation of the gradient amplitudes. In some embodiments, the image processor further identifies, from the first histogram curve, a second key direction relative to a secondary maximum accumulation of the gradient amplitude. The identification of the second key direction is based, in some implementations, on whether multiple boxes are expected in an image, knowledge of the packaging configuration, and/or expected divisions of items within a package (e.g., rows and/or columns of items, which may or may not be separated by dividers 306).

In step 910, a primary curve of gradients 802 of the pixels is generated and/or obtained based on the gradients that have the corresponding directional component that is within the first direction threshold of the first key direction. In step 912, a number of local maxima 804 corresponding to the first key direction are identified, from the primary curve of gradients 802, for the gradient amplitudes, of the pixel data, having a corresponding directional component that is within the first direction threshold of the first key direction. In step 914, a quantity of items 302 of the product being monitored is identified corresponding to a quantity of the number of local maxima 804 that are each within the threshold distance from one or more other local maxima of the number of local maxima 804.

Figure 10:
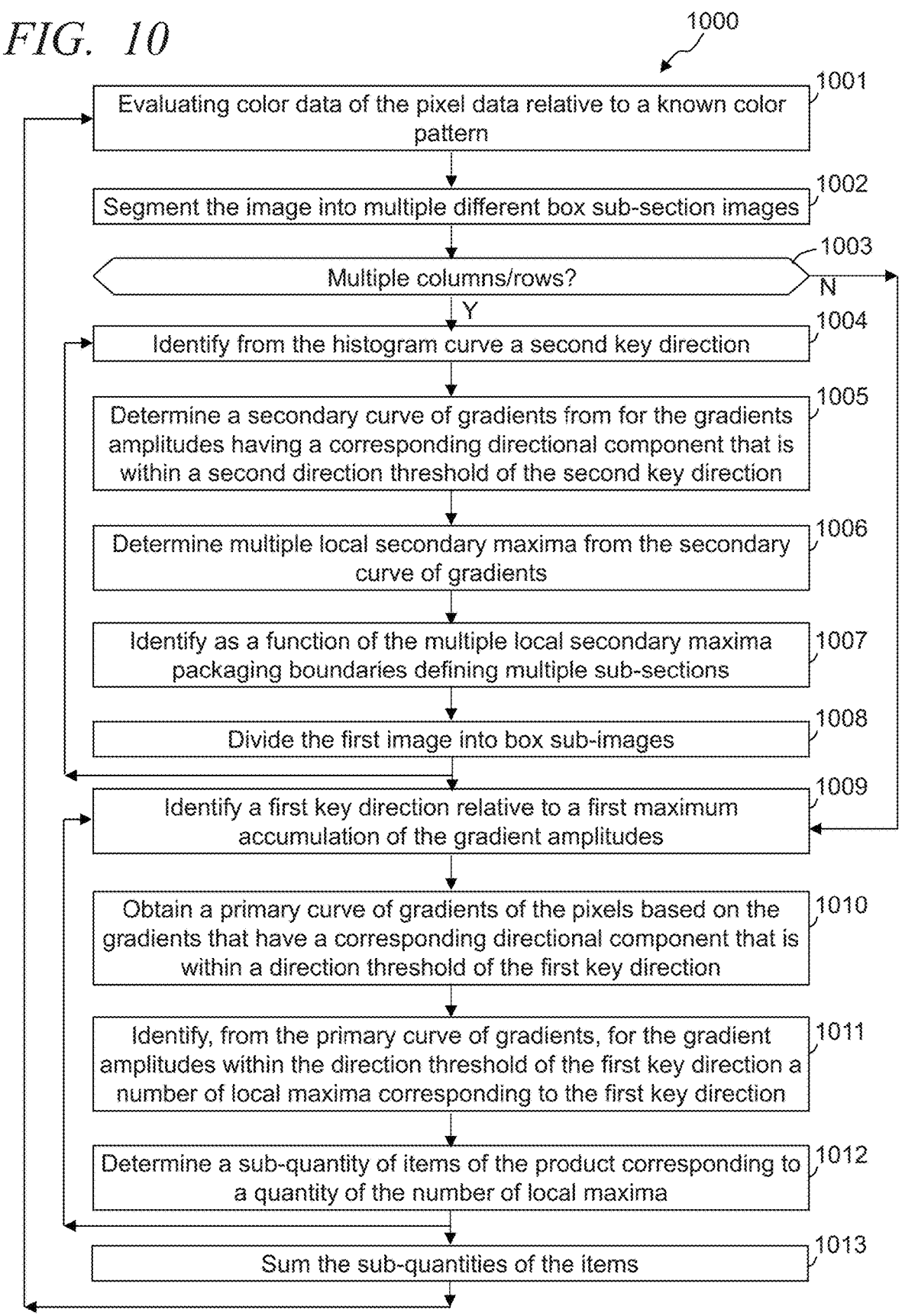
FIG. 10 illustrates a simplified flow diagram of an exemplary image dividing process of dividing an image based on boxes and/or packaging boundaries, in accordance with some embodiments.

As described above, in some embodiments an image 300 may be divided into box sub-section images 400 and/or column and/or row sub-images 702. FIG. 10 illustrates a simplified flow diagram of an exemplary image dividing process 1000 of dividing an image 300 based on boxes 304 and/or packaging boundaries 306, in accordance with some embodiments. The process 1000, in some implementations, is implemented by the image processing system 102 based on color evaluation and/or known packaging configurations. Further, in some embodiments, the process 1000 is implemented as part of the process 900, but it will be apparent to those skilled in the art that the process 1000 can be implemented in separate but in cooperation with the process 900, or implemented independent of the process 900. In some instances, for example, at least some of the image dividing process 1000 is implemented as part of or prior to step 910.

The process 1000, in some embodiments, includes optional step 1001 where the color data of the pixel data for the image 300 is evaluated relative to a known color pattern of packaging of the product being monitored. Some embodiments further take into consideration the known dimensions of the packaging of the product relative to the known color pattern in identifying packaging walls and/or external boundaries of one or more boxes 304. In optional step 1002, the first image is segmented, from within the first image based on the evaluation of the color data, into multiple different box sub-section images 400 of the image 300. In some embodiments, a fast clustering method (e.g., k-nearest neighbors algorithm) is applied to identify box boundaries and identify where to separate the image 300 into the box sub-section images 400. Steps 1001 and 1002 may be skipped when it is known that not more than one open box is being evaluated and/or captured in an image 300.

In step 1003, it is determined, based on known packaging of the product being monitored, whether the items 302 are divided into sub-sections (e.g., multiple columns and/or rows). When a box does not include sub-sections of items, the process 1000 advances to step 1009. Alternatively, some embodiments include optional step 1004 where the image processing system 102 identifies from the histogram curve the second key direction when the second key direction has not already been identified. In step 1005, a secondary curve of gradients 600 is determined for the gradients amplitudes, of the pixel data for a respective box sub-image 400, having a corresponding directional component that is within a second direction threshold of the second key direction. In step 1006, one or more local secondary maxima 602 are determined from the secondary curve of gradients 600.

In step 1007, packaging boundaries 306 and/or sections of sub-sets of items 302 are identified within the image 300 as a function of the multiple local secondary maxima 602. Again, the packaging boundaries 306 typically define multiple sub-sections 610 of a respective packaging in which the items 302 of the product are positioned. Additionally or alternatively, items 302 may be organized in sub-sets that define columns and/or rows without actual interior packaging boundaries 306. In some embodiments, the boundaries of these sub-sets of items are further identified based on the secondary maxima 602 and knowledge of an organization of items within the packaging. In step 1008 the image 300 and/or box sub-image 400 is divided into multiple column, row or other item organized sub-images 700 each corresponding to one of the sub-sections 610 of the packaging identified based on the identified packaging boundaries. Steps 1004-1008 can be repeated any number of times for the different identified box sub-images 400, multiple images and/or frames of video content.

In step 1009, a first key direction is identified from the histogram curve relative to a first maximum accumulation of the gradient amplitudes of the image 300, a respective box sub-image 400 or a respective sub-image 702. In step 1010, a primary curve of gradients 802 of the pixels is generated and/or obtained based on the gradients that have the corresponding directional component that is within a first direction threshold of the first key direction. Again, in some implementations, the first key direction is orthogonal to the second key direction.

In step 1011, a subset local maxima 804 of a respective sub-image are identified corresponding to the first key direction in the respective sub-image, from the primary curve of gradients 802, for the gradient amplitudes, of the pixel data, having a corresponding directional component that is within the first direction threshold of the first key direction. In step 1012, a sub-quantity of items 302 corresponding to a sub-quantity of the subset of the number of the local maxima of the respective sub-image 702 is identified corresponding to a quantity of the number of local maxima 804. The sub-quantities of items, in some implementations, comprises the identification, for each box sub-section image of multiple box sub-section images, the number of local maxima corresponding to the first key direction. Some embodiments further identify local maxima that are each within a threshold distance from one or more other local maxima of the number of local maxima 804. Steps 1009-1012 can be repeated any number of times for the sub-images 702. In some embodiments, the sub-quantities are determined as a function of multiple boxset quantities of the items of the product that each correspond to one of the box sub-section images. The respective boxset quantity of the items typically corresponds to respective quantities of the number of the local maxima that are each within the threshold distance from another one of the number of local maxima as identified from respective ones of the multiple box sub-section images. In step 1013, the determined sub-quantities of the items 302 of the product are summed in determining the total quantity of items 302 of the product being monitored. In some embodiments, multiple sub-quantities of items are summed from multiple sub-images (e.g., one or more row image and/or column image) to identify a box quantity of a number of items detected in a box image. Still further, when multiple box images are separated out, a total number of items per image can be determined by summing boxset quantities of multiple identified boxes, and/or summing sub-quantities of the multiple different boxes.

Figure 11:
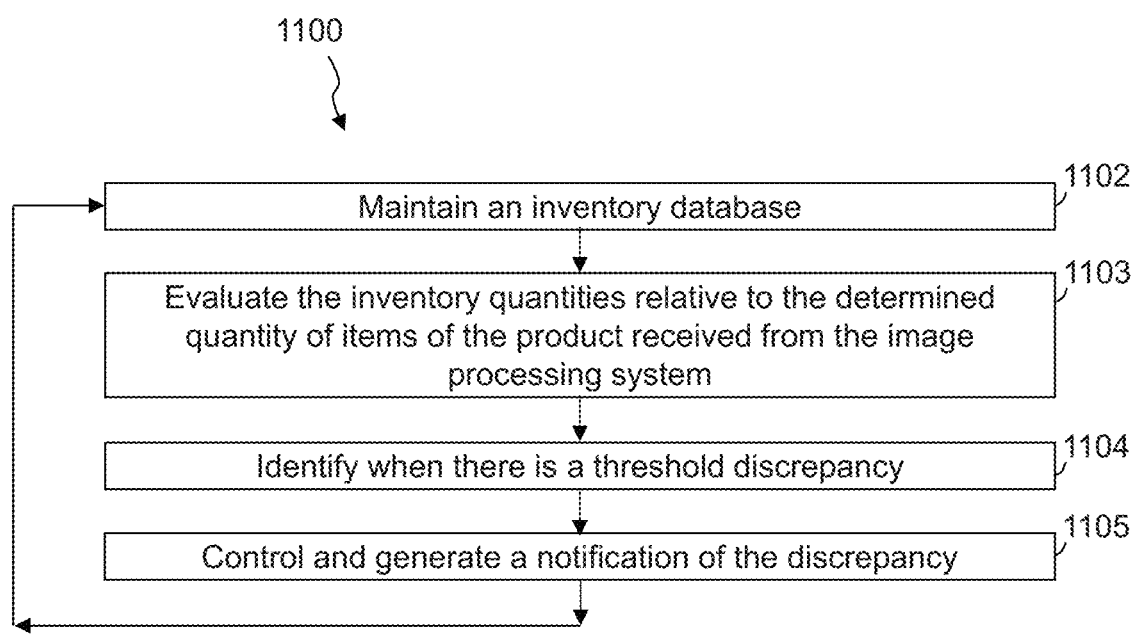
FIG. 11 illustrates a simplified flow diagram of an exemplary process of identifying inventory discrepancies, in accordance with some embodiments.

FIG. 11 illustrates a simplified flow diagram of an exemplary process 1100 of identifying inventory discrepancies, in accordance with some embodiments. In step 1102 an inventory database 124c is maintained by repeatedly updating relevant quantities over time as a function of sales data received from the POS systems 112. Still further, the inventory quantities, in some embodiments, is further updated based on other inventory factors and/or events, such as but not limited to product shipping information corresponding to items of products received at a retail facility, manual count numbers of inventory on shelves and/or other locations in the retail facility, throw-away information corresponding to information about items discarded (e.g., due to damage, expiration, etc.), quantiles and/or estimated quantities of losses (e.g., due to theft, incorrectly identifying an item during a sale, etc.), other such inventory events and/or information, and typically a combination of two or more of such inventory events and/or information.

In step 1103, the inventory quantities are evaluated relative to the determined quantity of items 302 of the product received from the image processing system 102. The evaluation, in some embodiments, includes evaluating the determined quantities of the item relative those sold. Similarly, some embodiments use historic determined quantities over time relative to sales. Additionally or alternatively, the determined quantities from the one or more images are used to determine a total number of quantities believed to be available through the retail facility and evaluate the determined quantities relative to sales. In step 1104, the process identifies when there is a threshold discrepancy as a function of the inventory quantities relative to the determined quantity of items of the first product. Again, the system tracks over time the inventory and quantities of items, in part using the images and the counts of items. The sales should result in a corresponding decrease in a number of items of the product. Accordingly, the process identifies a threshold discrepancy between quantities of items in the retail facility and/or on the sales floor versus expected quantities determined based on a historic determined quantity and the number of items sold. For example, some embodiments maintain an expected quantity (e.g., determined based on a previous count). That expected quantity is decreased each time an item is sold, and further adjusted over time based one or more other factors (e.g., throw-away, increase in quantity based on a received shipment, etc.). As such, an expected quantity is maintained over time. This expected quantity can be evaluated relative to the quantities determined from the one or more images to determine when a threshold discrepancy or difference is detected.

In step 1105, a notification of the discrepancy is generated and communicated to one or more systems to control the one or more systems to generate an announcement, warning and/or other such notification to one or more users associated with the one or more systems. For example, a notification can be generated and communicated to one or more point of sale systems 112 to cause an alert (e.g., displayed alert, audible alert, etc.) to notify respective operators of those point of sale systems. As another non-limiting example, a notification can be generated and communicated to one or more portable computing systems causing an application operating one the portable computing system to generate one or more alerts (e.g., displayed alert, audible alert, etc.). As yet another non-limiting example, the notification system can control one or more product tracking systems 116 and/or loss tracking systems that evaluates historic image and/or video data associated with the product to identify potential instances when a threshold change occurred. Still further, the notification can control the product tracking system 116 and/or a suspicious activity tracking system that uses threshold changes to identify one or more potential individuals associated with the threshold change, and track the movement through the retail facility to determine whether or not the individual accurately paid for the items of the product. Similarly, the notification system can control one or more portable devices to direct one or more workers to track and/or interface with one or more individuals associated with the threshold change in the number of items and/or associated with a threshold disparity in inventory quantities and sales information.

Figure 12:
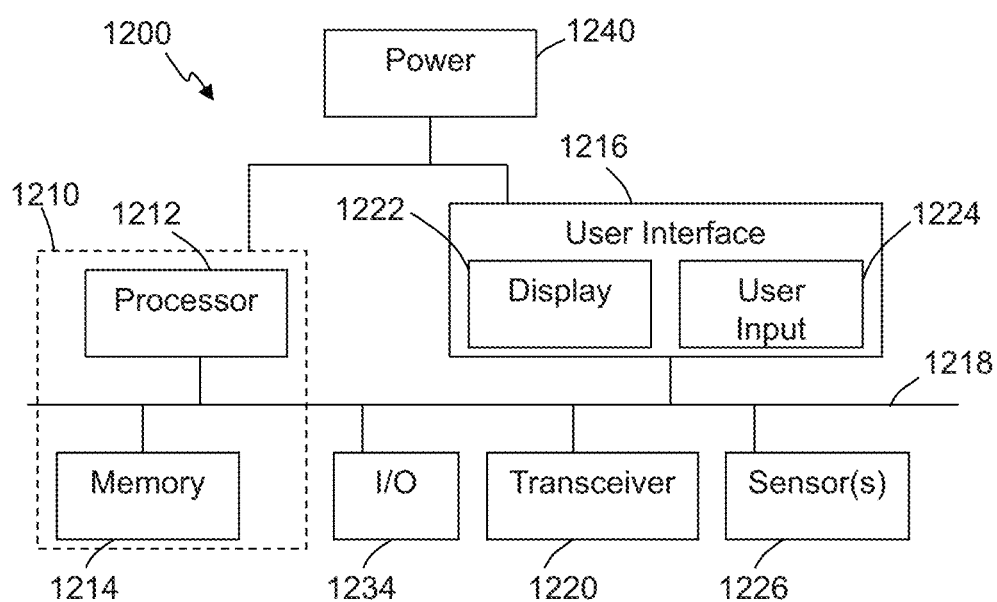
FIG. 12 illustrates an exemplary system for use in implementing methods, techniques, devices, apparatuses, systems, servers, sources and providing image processing, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 12 illustrates an exemplary system 1200 that may be used for implementing any of the components, circuits, circuitry, systems, functionality, apparatuses, processes, or devices of image evaluation system 100, and/or other above or below mentioned systems or devices, or parts of such circuits, circuitry, functionality, systems, apparatuses, processes, or devices. For example, the system 1200 may be used to implement some or all of image processing system 102, camera systems 106, POS 112, product tracking system 116, the computing system 130, the control system 123, the sensor systems 132, and/or other such components, circuitry, functionality and/or devices. However, the use of the system 1200 or any portion thereof is certainly not required.

By way of example, the system 1200 may comprise a control circuit or processor module 1212, memory 1214, and one or more communication links, paths, buses or the like 1218. Some embodiments may include one or more user interfaces 1216, and/or one or more internal and/or external power sources or supplies 1240. The control circuit 1212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1212 can be part of control circuitry and/or a control system 1210, which may be implemented through one or more processors with access to one or more memory 1214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1200 may be used to implement one or more of the above or below, or parts of, components, circuits, systems, processes and the like. For example, the system may implement the image processing system 102 with the control circuit being a retail service control circuit implemented through one or more image processing processors and/or processing systems, the camera systems 106 with a camera system control circuit, the POS systems 112 with the control circuit being a POS system control circuit, a product tracking system 116 with the control circuit being a product tracking system control circuit, and/or other components.

The user interface 1216 can allow a user to interact with the system 1200 and receive information through the system. In some instances, the user interface 1216 includes a display 1222 and/or one or more user inputs 1224, such as buttons, touch screen, track ball, keyboard, mouse, etc., which can be part of or wired or wirelessly coupled with the system 1200. Typically, the system 1200 further includes one or more communication interfaces, ports, transceivers 1220 and the like allowing the system 1200 to communicate over a communication bus, a distributed computer and/or communication network 108 (e.g., a local area network (LAN), the Internet, wide area network (WAN), etc.), communication link 1218, other networks or communication channels with other devices and/or other such communications or combination of two or more of such communication methods. Further the transceiver 1220 can be configured for wired, wireless, optical, fiber optical cable, satellite, or other such communication configurations or combinations of two or more of such communications. Some embodiments include one or more input/output (I/O) ports 1234 that allow one or more devices to couple with the system 1200. The I/O ports can be substantially any relevant port or combinations of ports, such as but not limited to USB, Ethernet, or other such ports. The I/O interface 1234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1226 to provide information to the system and/or sensor information that is used by that system and/or communicated to another component, such as the control system 123, a POS system 122, product tracking system 116, the image processing system, etc. The sensors can include substantially any relevant sensor, such as but not limited to optical-based scanning sensors to sense and read optical patterns (e.g., bar codes), radio frequency identification (RFID) tag reader sensors capable of reading RFID tags in proximity to the sensor, weight sensor systems, movement sensor systems, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1200 comprises an example of a control and/or processor-based system with the control circuit 1212. Again, the control circuit 1212 can be implemented through one or more processors, controllers, central processing units, logic, software and the like. Further, in some implementations the control circuit 1212 may provide multiprocessor functionality.

The memory 1214, which can be accessed by the control circuit 1212, typically includes one or more processor-readable and/or computer-readable media accessed by at least the control circuit 1212, and can include volatile and/or nonvolatile media, such as RAM, ROM, EEPROM, flash memory and/or other memory technology. Further, the memory 1214 is shown as internal to the control system 1210; however, the memory 1214 can be internal, external or a combination of internal and external memory. Similarly, some or all of the memory 1214 can be internal, external or a combination of internal and external memory of the control circuit 1212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 108. The memory 1214 can store code, software, executables, scripts, data, content, lists, programming, programs, log or history data, user information, customer information, product information, and the like. While FIG. 12 illustrates the various components being coupled together via a bus, it is understood that the various components may actually be coupled to the control circuit and/or one or more other components directly.

Some embodiments provide image evaluation systems, comprising: a plurality of camera systems distributed about a retail facility and each of the plurality of camera systems is configured to capture images of items of one or more products of a plurality of products within the retail facility that are accessible and retrievable by customers for purchase; an image processing system communicatively coupled with each of the plurality of camera systems, wherein the image processing system is configured to receive multiple images over time from a first camera system of the plurality of camera systems having a location corresponding to a location of a first product to be monitored of the multiple products to be monitored, process each of the multiple images comprising for each image of the multiple images: determine, from pixel data for each pixel of at least a first sub-section of the first image, a gradient amplitude and directional component; determine a first histogram curve from the gradient amplitudes as a function of the directional component of the pixel data, and identify a first key direction relative to a first maximum accumulation of the gradient amplitudes; for the gradient amplitudes, of the pixel data, having a corresponding directional component that is within a first direction threshold of the first key direction, identify a number of local maxima corresponding to the first key direction; and determine a quantity of items of the first product corresponding to a quantity of the number of local maxima that are each within a threshold distance from another one of the number of local maxima.

Some embodiments provide methods of processing images, comprising: receiving, at an image processing system from a plurality of camera systems distributed about a retail facility and configured to capture images of items of one or more products of a plurality of products within the retail facility that are accessible and retrievable by customers for purchase, multiple images over time from a first camera system of the plurality of camera systems having a location corresponding to a location of a first product to be monitored of the multiple products to be monitored; for each image: determining, from pixel data for each pixel of at least a first sub-section of the first image, a gradient amplitude and directional component; determining a first histogram curve from the gradient amplitudes as a function of the directional component of the pixel data, and identify a first key direction relative to a first maximum accumulation of the gradient amplitudes; identifying, for the gradient amplitudes, of the pixel data, having a corresponding directional component that is within a first direction threshold of the first key direction, a number of local maxima corresponding to the first key direction; and determining a quantity of items of the first product corresponding to a quantity of the number of local maxima that are each within a threshold distance from another one of the number of local maxima.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An image evaluation system, comprising:
   a camera system configured to capture images of items of a product over a period of time, the items of the products being stored in a monitored location within a retail facility where the items of the product are accessible and retrievable by customers for purchase, wherein the images capture a customer entering and leaving the monitored location; and
   an image processing system communicatively coupled with the camera system, wherein the image processing system is configured to receive the images from the camera system, to determine, from pixel data of the images, gradient amplitudes and directional component(s) associated with the items of the product, to determine a first histogram curve from the gradient amplitudes as a function of the directional component(s), to identify a key direction relative to a maximum accumulation of the gradient amplitudes, to identify local maxima corresponding to the key direction, to determine a change in quantity of the items of the product between the customer entering and leaving the monitored location based on a quantity of the local maxima within a threshold distance from another one of the local maxima, to track movement of the customer throughout the retail facility in response to the change in quantity of the items of the product exceeding a threshold, and to notify an employee to interface with the customer following checkout.

2. The system of claim 1, further comprising:
   point of sale (POS) systems within the retail facility configured to complete sales transactions for customers of items of different products and to communicate sales data of the completed sales transactions; and
   a product tracking system communicatively coupled with the image processing system and configured to:
   maintain an inventory database comprising inventory quantities as a function of the sales data and product shipping information;
   evaluate the inventory quantities relative to the quantity of items of the product received from the image processing system;
   identify when there is a threshold discrepancy as a function of the inventory quantities relative to the quantity of items of the product; and
   generate a notification of the discrepancy.

3. The system of claim 1, wherein the image processing system is further configured to:
   identify, from the first histogram curve, a key direction relative to a secondary maximum accumulation of the gradient amplitudes;
   for the gradient amplitudes, of the pixel data, having a corresponding directional component that is within a second direction threshold of the key direction relative to a secondary maximum accumulation, determine a secondary curve of gradients;
   determine, from the secondary curve of gradients, multiple local secondary maxima;
   identify, within the image and as a function of the multiple local secondary maxima, packaging boundaries defining multiple sub-sections of a packaging in which the items of the product are positioned;
   divide the image into sub-images each corresponding to one of the sub-sections of the packaging identified based on the identified packaging boundaries;
   identify, within each sub-image, a subset of a number of local maxima corresponding to the key direction in the respective sub-image;
   determine a sub-quantity of the items of the product corresponding to a sub-quantity of the subset of the number of the local maxima of the respective sub-image; and
   sum the determined sub-quantities of the items of the product in determining the quantity of items.

4. The system of claim 3, wherein the multiple sub-sections of the packaging each corresponds to one of multiple columns of the packaging and within each of the columns is contained the respective sub-quantity of the items of the product.

5. The system of claim 3, wherein the image processing system, in identifying the number of local maxima corresponding to the key direction, is configured to obtain a primary curve of gradients of pixels based on the gradients that have the corresponding directional component that is within a direction threshold of the key direction; and
   determine, from the primary curve of gradients, the number of local maxima corresponding to the key direction.

6. The system of claim 5, wherein the key direction is substantially orthogonal to the key direction relative to a secondary maximum accumulation.

7. The system of claim 1, wherein the image processing system is further configured to evaluate color data of the pixel data relative to a known color pattern of packaging of the product based on known dimensions of the packaging of the product; and
   segment, from within the image based on the evaluation of the color data, the image into multiple different box sub-section images of the image.

8. The system of claim 7, wherein the image processing system, in determining the quantity of the items of the product, is configured to:
   identify, for each box sub-section image, the key direction relative to the maximum accumulation of the gradient amplitudes;

identify, for each box sub-section image of the multiple box sub-section images, a number of local maxima corresponding to the key direction; and determine multiple boxset quantities of the items of the product each corresponding to one of the box sub-section image of the image, wherein the respective boxset quantity of the items of the product corresponding to respective quantities of a of the local maxima that are each within the threshold distance from another one of a number of local maxima, and sum the multiple boxset quantities to obtain the quantity of items of the product.

9. The system of claim 7, wherein the image processing system, in evaluating the color data of the pixel data, is configured to:

apply a color clustering to the pixel data of the image based on the known color pattern of the packaging of the product; and segment the image into the multiple box sub-section images based on the color clustering.

10. A method of processing images, comprising:

receiving, by an image processing system from a camera system, images of items of a product captured by the camera system over a period of time, the items of the products being stored in a monitored location within a retail facility where the items of the product are accessible and retrievable by customers for purchase, wherein the images capture a customer entering and leaving the monitored location;

determining, from pixel data of the images, gradient amplitudes and directional component(s) associated with the items of the product;

determining a first histogram curve from the gradient amplitudes as a function of the directional component(s);

identifying a key direction relative to a maximum accumulation of the gradient amplitudes;

identifying local maxima corresponding to the key direction;

determining a change in quantity of the items of the product between the customer entering and leaving the monitored location based on a quantity of the local maxima within a threshold distance from another one of the local maxima, to track movement of the customer throughout the retail facility in response to the change in quantity of the items of the product exceeding a threshold; and notifying an employee to interface with the customer following checkout.

11. The method of claim 10, further comprising:

completing, by point of sale (POS) systems within the retail facility configured to complete sales transactions for customers of items of different products and to communicate sales data of the completed sales transactions;

maintaining, by a product tracking system, an inventory database comprising inventory quantities as a function of the sales data and product shipping information;

evaluating, by the product tracking system, the inventory quantities relative to the quantity of items of the product received from an image processing system;

identifying, by the product tracking system, when there is a threshold discrepancy as a function of the inventory quantities relative to the quantity of items of the product; and generating, by the product tracking system, a notification of the discrepancy.

12. The method of claim 10, further comprising:

identifying, from the first histogram curve, a key direction relative to a secondary maximum accumulation of the gradient amplitudes;

determining a secondary curve of gradients for the gradient amplitudes, of the pixel data, having a corresponding directional component that is within a direction threshold of the key direction relative to a secondary maximum accumulation, determining, from the secondary curve of gradients, multiple local secondary maxima;

identifying, within the image and as a function of the multiple local secondary maxima, packaging boundaries defining multiple sub-sections of a packaging in which the items of the product are positioned;

dividing the image into sub-images each corresponding to one of the sub-sections of the packaging identified based on the identified packaging boundaries;

identifying, within each sub-image, a subset of a number of local maxima corresponding to the key direction in the respective sub-image;

determining a sub-quantity of the items of the product corresponding to a sub-quantity of the subset of the number of the local maxima of the respective sub-image; and summing the determined sub-quantities of the items of the product in determining the quantity of items.

13. The method of claim 12, wherein the multiple sub-sections of the packaging each corresponds to one of multiple columns of the packaging and within each of the columns is contained the respective sub-quantity of the items of the product.

14. The method of claim 12, wherein the image processing system, in identifying the number of local maxima corresponding to the key direction, is configured to obtain a primary curve of gradients of pixels based on the gradients that have the corresponding directional component that is within a direction threshold of the key direction; and determine, from the primary curve of gradients, the number of local maxima corresponding to the key direction.

15. The method of claim 14, wherein the key direction is substantially orthogonal to the key direction relative to a secondary maximum accumulation.

16. The method of claim 10, wherein the image processing system is further configured to evaluate color data of the pixel data relative to a known color pattern of packaging of the product based on known dimensions of the packaging of the product; and segment, from within the image based on the evaluation of the color data, the image into multiple different box sub-section images of the image.

17. The method of claim 16, wherein the image processing system, in determining the quantity of the items of the product, is configured to:

identify, for each box sub-section image, the key direction relative to the maximum accumulation of the gradient amplitudes;

identify, for each box sub-section image of the multiple box sub-section images, a number of local maxima corresponding to the key direction; and determine multiple boxset quantities of the items of the product each corresponding to one of the box sub-section image of the image, wherein the respective boxset quantity of the items of the product corresponding to respective quantities of a of the local maxima that are each within the threshold distance from another one of a number of local maxima, and sum the multiple boxset quantities to obtain the quantity of items of the product.

18. The method of claim 16, wherein the image processing system, in evaluating the color data of the pixel data, is configured to:
- apply a color clustering to the pixel data of the image based on the known color pattern of the packaging of the product; and
- segment the image into the multiple box sub-section images based on the color clustering.

\* \* \* \* \*